Aug. 13, 1940.  W. A. KENNEDY  2,211,272
COUNTING MECHANISM
Filed Nov. 28, 1938  2 Sheets-Sheet 1
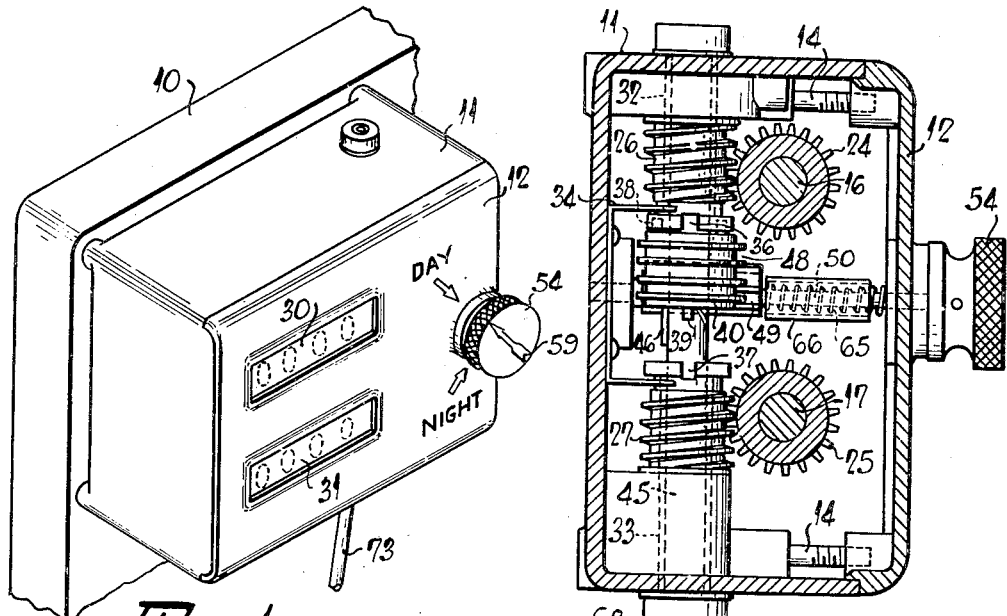
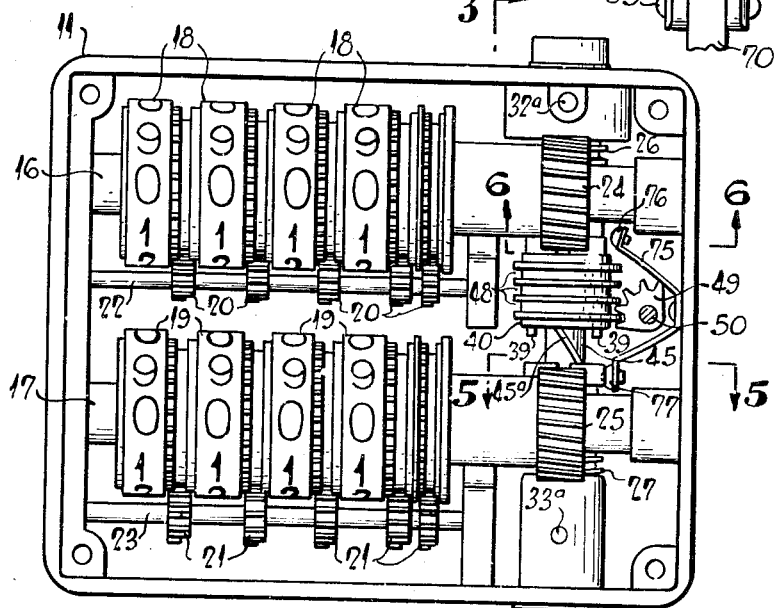
Woodford A. Kennedy
Inventor
By [signature]
Attorney Aug. 13, 1940.  W. A. KENNEDY  2,211,272
COUNTING MECHANISM
Filed Nov. 28, 1938    2 Sheets-Sheet 2
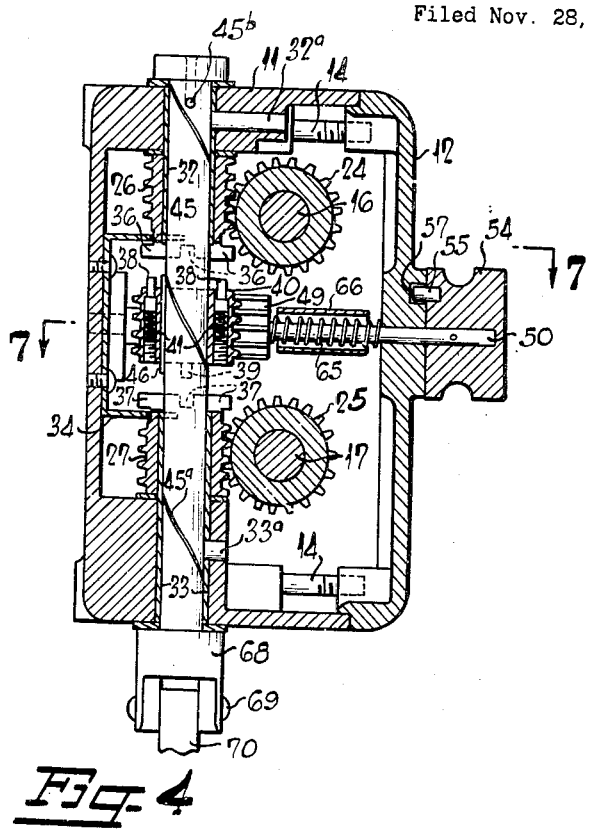
Fig. 4
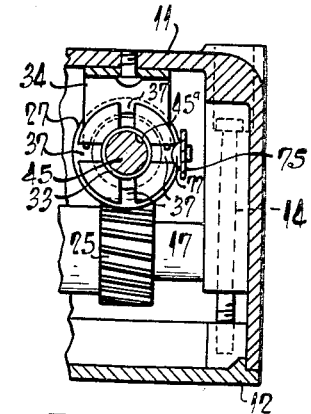
Fig. 5
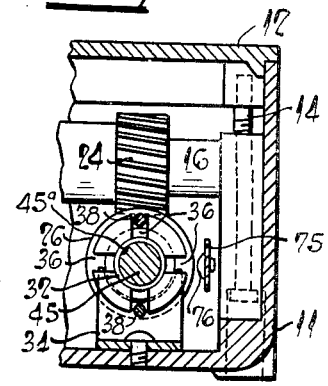
Fig. 6
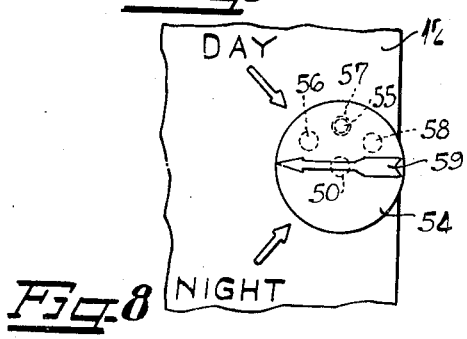
Fig. 7
Fig. 8
Woodford A. Kennedy
Inventor
Attorney Patented Aug. 13, 1940

2,211,272

UNITED STATES PATENT OFFICE 2,211,272

COUNTING MECHANISM

Woodford A. Kennedy, Charlotte, N. C.

Application November 28, 1938, Serial No. 242,824

3 Claims. (Cl. 74—428)

This invention relates to a counter mechanism and more especially to a pick counter for looms equipped with a plurality of pick registering devices, whereby the picks for the day and the night shifts can be separately registered. In many conventional counters, the day and night shift pick registering devices are driven from a constantly rotating shaft which, in turn, is driven from the crank shaft of the loom. Also a clutch mechanism is provided so that the shaft may be selectively connected by way of intermediate gears to either of the pick registering means or it may be disconnecting from either and placed in neutral position. Since the intermediate gears are mounted around the constantly rotating shaft, much difficulty has been encountered by the creeping of these gears, even when the clutch was disconnected, resulting in a registering device giving a false reading. This creeping usually results from the frictional contact between the intermediate gear and the constantly rotating driving shaft due to deposits of foreign substances.

It is, therefore, an object of this invention to interpose a stationary sleeve between said stationary driving gear and said constantly driven shaft so that the gear will be shielded from any frictional contact from the rotating shaft.

It is a further object of this invention to provide a pick counter for looms comprising a plurality of pick registering devices which are driven from a constantly rotating shaft, a clutch mechanism capable of being selectively connected by way of intermediate gears to either of said registering devices, means for shielding or preventing any frictional contact between said intermediate gears and said constantly rotating shaft, and means for locking either or both of said gears when their corresponding registering means are not in use.

Some of the objects of the invention having been stated, other objects will appear as the description proceeds when taken in connection with the accompanying drawings, in which—

Figure 1 is an isometric view of a pick counter embodying my invention;

Figure 2 is a front elevation of Figure 1 with its cover removed and showing the clutch shifting shaft in section;

Figure 3 is a transverse vertical sectional view taken along the line 3—3 in Figure 2;

Figure 4 is a transverse vertical sectional view similar to Figure 3, but showing the operating shaft in elevation with the parts mounted thereon in section;

Figure 5 is a sectional view taken along the line 5—5 in Figure 2;

Figure 6 is a sectional view taken along the line 6—6 in Figure 2;

Figure 7 is a sectional view taken along the line 7—7 in Figure 4;

Figure 8 is a fragmentary elevation similar to the right-hand portion of Figure 1, showing the detents in the casing, which are used for locking the clutch mechanism in the desired position.

Referring more specifically to the drawings, the numeral 10 denotes a portion of a loom frame to which is secured casing 11. This casing has a cover 12 attached to the front side thereof by any suitable means such as screws 14. Disposed within the casing 11 are shafts 16 and 17, which shafts have mounted thereon figure wheels 18 and 19, respectively. These figure wheels are operated in a well known manner by gears 20 and 21 which are disposed upon shafts 22 and 23 respectively. The figure wheels 18 and 19 and gears 20 and 21 are turned by means of pinions 24 and 25, and these pinions are adapted to mesh with worms 26 and 27, respectively. By referring to Figure 1, it is seen that a row of alined figures on the figure wheels 18 are visible through window 30; whereas another row of alined figures on the figure wheels 19 are visible through the window 31. The window 30 indicates the total number of picks registered during the day shift and as the window 31 indicates the total number of picks which have been registered during the night shift.

Of course when the figure wheels 18 are in operation for registering the picks during the day shift, the figure wheels 19 of the night shift are idle and vice versa. The worm gears 26 and 27 are rotatably mounted around sleeves 32 and 33, respectively, said sleeves being mounted in a stationary position in the casing 11, by any suitable means such as a pressed fit or pins 32a and 33a. In order to hold the worm gears 26 and 27 in their proper position, a suitable U-shaped member 34 is provided and the prongs of this U-shaped member partially encircle the proximate end portions of the worms 26 and 27 to prevent them from sliding longitudinally of the sleeve 32 and 33. The manner in which the U-shaped member 34 engages the worms 26 and 27, is clearly shown in Figures 3, 4, 5 and 6.

The proximate ends of the worm gears 26 and 27 have an enlarged rim portion which portions have notches 36 and 37 respectively therein. These notches are adapted to be engaged by the ends of plungers 38 and 39, respectively, which plungers are slidably mounted in clutch member 40. Each of the plungers 38 and 39 is confined in a suitable bore in this clutch member 40 and it is seen by referring to Figure 4 that a compression spring 41 is provided in each one of these bores for normally and resiliently pressing the plungers outwardly to an engaging position. The clutch member 40 is slidably keyed upon a shaft 45 by any suitable means such as key 46.

By referring to Figure 4 it is seen that the sleeves 32 and 33 prevent any frictional contact whatever between the shaft 45 and the worms 26 and 27. Therefore, as the shaft 45 turns there is no possibility of either of the worms 26 or 27 turning unless they are connected to the shaft 45 by way of the clutch member 40. This clutch 40 is shown in neutral position in Figure 4, whereas it is shown in engaged position with the day pick registering mechanism in Figures 2 and 3.

The clutch member 40 has a spiral groove 48 which is engaged by a gear segment 49, said gear segment being fixedly secured around shaft 50. This shaft 50 has its ends slidably mounted in the casing 11 and the cover 12 and fixedly secured on one end thereof is a knurled handle 54 which is used for turning the shaft and the gear segment 50 when it is desired to change the position of the clutch member 40 and cause it to be engaged from either of the worms 26 and 27. It is seen by referring to Figures 4 and 7 and 8 that the knurled handle 54 has projecting therefrom a suitable pin 55 and this pin is adapted to engage either of the cavities 56, 57 or 58 dependent upon the position that it is desired the clutch member 40 to assume. When the pin 55 engages the cavity 57 as shown in Figure 8, the arrow 59 on the base of the knurled member 54 points half-way between the arrow notation "Day" and "Night" on the cover 12. In this position the clutch member 40 is in neutral, that is in the position shown in Figure 4, and neither the worm 26 nor the worm 27 is engaged; consequently as the shaft 45 rotates, neither set of the figure wheels 18 or 19 will be rotated.

When it is desired to cause the clutch member 40 to become engaged with the day shift, that is, when it is desired to cause the figure wheels 18 to be operated and to register the number of picks of a loom, the handle 54 is rotated until the projection 57 is disposed in cavity 58 and at that time the arrow 59 on the handle 54 will be pointed directly towards the point of the arrow marked "Day" on the cover 12. At this time the clutch member 40 will be moved to the position shown in Figures 2 and 3 so that the projections 38 will penetrate the slots 36 in the worm 26.

Likewise when it is desired to cause the night shift mechanism to come into operation the handle 54 is rotated until projection 57 will engage the cavity 56 (Figure 8) and at that time the clutch member 40 will be moved downwardly to cause the projections 39 to fall into slots 37 in the end of worm 27. With the parts in this position, the rotation of shaft 45 will be imparted to the night registering figure wheels 19.

A compression spring 65 is disposed around the shaft 50 in order to normally force this shaft to the left (Figures 3, 4 and 7) so that the projection 55 will be held in one of the cavities 56, 57 or 58. This spring is shielded by a collar 66. When it is desired to move the projection 55 from one cavity to the other, it is necessary to pull knurled knob 54 to the right a slight amount (Figures 3, 4 and 7) and then turn this knob while in this position until projection 55 coincides with the desired cavity, after which it may be released and then the tension spring 65 will return the shaft to normal position.

The purpose in providing a spring 41 beneath the plungers 38 and 39 is to have a flexible connection between the worms 26 and 27 and the clutch member 40. This is necessary because at the time the shift is made by rotating the handle 54 and shaft 50, the projections 38 or 39 may not be exactly centered with the slots 36 or 37; consequently it is necessary for the plunger to give way and when the shaft 45 is rotated a sufficient amount to cause these plungers to coincide with these slots, then the plungers will automatically be forced into them by the springs 41, to cause a connection to be made between the clutch member and the selected worm which drives the registering apparatus. It is also seen that since no frictional contact is present between the worms 26 and 27 and the constantly rotating shaft 45, that there is no possibility of an idle or disconnected worm turning, even though the shaft 45 remains in motion.

The shaft 45 has a spiral groove 45a therein for the purpose of facilitating the lubrication of the wearing surface between the sleeves 32 and 33 and the shaft. The upper end of shaft 45 is hollow and has one or more holes 45b to allow lubricant to be introduced between the sleeves and the shaft. Also the lower end of this shaft has a fork 68 fixedly secured thereon to which is connected by means of a pin 69 a block 70. This block is connected to another fork 71 by means of a similar pin 72, said second fork being fixedly secured on the upper end of a shaft 73. The shaft 73 projects downwardly and is connected to the cam shaft of a loom by conventional means, not shown.

Although there is no frictional contact between the shaft 45 and worms 26 and 27, it has nevertheless been found to be advisable to provide some means for locking these wheels or worms when their corresponding registering means is not in operation. Therefore, a resilient V-shaped member 75 has been provided, one prong of which has a semi-spherical member 76 therein for engaging the notches 36 in worm 26. The other prong has a semi-circular spherical portion 77 thereon for engaging the notches 37 of worm 27. This V-shaped member is adapted to straddle the segment 49 in the manner shown in Figure 2 and it is seen that when the shaft 50 and the gear segment is turned to the position where the clutch 40 will engage the worm 26, that this gear segment also engages one leg of the V-shaped members 75 and causes the semi-spherical member 76 to become disengaged from its notch 36. However, at the same time it should be noted that the member 77 remains engaged with its notch 37; consequently the worm 27 will not be allowed to rotate from any cause such as vibration, but the worm 26 is to be turned. Conversely, when the clutch member 40 is moved into engagement with the worm 27 to cause the night registering means to go into operation, the members 76 will be moved by the inherent resiliency of the leg of member 75 into one of the cavities 36 to lock the member 26 and at the same time the lower end of gear segment 49 will engage the lowermost prong (Figure 2) of the V-shaped member 75 and remove the portion 77 from the notch 37 and thereby release worm 27, so that the clutch member 40 can turn this gear segment and cause the night registering means to go into operation.

It is therefore seen that I have provided a simple means for preventing frictional contact between the constantly rotating shaft in a counter and the intermediate clutch worm gears for actuating the registering means, thereby eliminating any creeping in a registering device which may be idle.

In the drawings and specification there has been set forth a preferred embodiment of the invention, and although specific terms are employed, they are used in a generic and descriptive sense only, and not for purposes of limitation, the scope of the invention being set forth in the appended claims.

I claim:

1. In a counter mechanism, the combination of a drive shaft, and a pair of counter shafts, a housing penetrated by the drive shaft, a pair of sleeves fixed to the housing and projecting inwardly into the housing in alinement with each other and in which the drive shaft is mounted for rotation, a driving member keyed on the drive shaft and slidable longitudinally of the drive shaft, a worm mounted on each of the sleeves, a gear on each counter shaft having engagement with one of the worms mounted on said sleeves, each end of the driving member on the drive shaft and the proximate ends of the worms on the sleeves having clutch faces, and means for moving the driving member longitudinally of the drive shaft for selectively engaging one of the worms at a time to drive one of the counter shafts.

2. In a counter mechanism, a rotary shaft, a pair of counter shafts, a housing penetrated by the rotary shaft, a pair of sleeves fixed to the housing and projecting inwardly into the housing in alinement with each other and in which the rotary shaft is mounted for rotation, a driving member keyed on the rotary shaft and slidable longitudinally of the rotary shaft, a worm mounted on each of the sleeves, a gear on each counter shaft having engagement with one of the worms mounted on said sleeves, each end of the driving member on the rotary shaft and the proximate ends of the worms on the sleeves having clutch faces, means for moving the driving member longitudinally of the rotary shaft for selectively engaging one of the worms at a time to drive one of the counter shafts and means for arresting said driving member in neutral position out of contact with either of said worms.

3. In mechanism of the kind described, a pair of spaced sleeves, a drive shaft mounted for rotation in said sleeves, a pair of spaced parallel shafts disposed at right angles to the drive shaft and having one of their ends disposed adjacent to the sleeves, a member rotatably mounted on each of said sleeves and having a driving connection with the parallel shafts, a driving member mounted on the drive shaft and being disposed for sliding movement between said sleeves, the proximate ends of the members mounted on the sleeves and the ends of the driving member having clutch faces thereon, and means for shifting the driving member into engagement with the rotary members one at a time to impart movement to one of the parallel shafts at a time without exerting any frictional motion to the other rotatable member.

WOODFORD A. KENNEDY.